United States Patent
Sabo

(10) Patent No.: US 11,568,366 B1
(45) Date of Patent: Jan. 31, 2023

(54) SYSTEMS AND METHODS FOR GENERATING STATUS REQUESTS FOR UNITS OF WORK

(71) Applicant: Asana, Inc., San Francisco, CA (US)

(72) Inventor: Gregory Louis Sabo, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 195 days.

(21) Appl. No.: 16/224,374

(22) Filed: Dec. 18, 2018

(51) Int. Cl.
- *G06Q 10/10* (2012.01)
- *H04L 51/046* (2022.01)
- *G06Q 10/06* (2012.01)

(52) U.S. Cl.
CPC ....... *G06Q 10/103* (2013.01); *G06Q 10/0633* (2013.01); *G06Q 10/06316* (2013.01); *G06Q 10/063114* (2013.01); *H04L 51/046* (2013.01)

(58) Field of Classification Search
None
See application file for complete search history.

(56) References Cited

U.S. PATENT DOCUMENTS

| | | |
|---|---|---|
| 5,233,687 A | 8/1993 | Henderson, Jr. |
| 5,524,077 A | 6/1996 | Faaland |
| 5,530,861 A | 6/1996 | Diamant |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | David |
| 6,938,048 B1 | 8/2005 | Jilk |
| 7,003,668 B2 | 2/2006 | Berson |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS

Asana Demo and Product Tour, you tube excerpt, Dec. 7, 2017 https://www.youtube.com/watch?v=MAFWVLGFyw (16 pages) (Year: 2017) (Year: 2017).*

(Continued)

*Primary Examiner* — Aryan E Weisenfeld
*Assistant Examiner* — Donald J Edmonds
(74) *Attorney, Agent, or Firm* — Esplin & Associates, PC

(57) ABSTRACT

Systems and methods for generating status requests for units of work are disclosed. Some implementations may: manage environment state information maintaining a collaboration environment; identify one or more work unit records having potentially incorrect status values for a status parameter; generate status requests prompting user input to update the potentially incorrect status values for the one or more work unit records identified; and effectuate presentation of the status requests, such that the first status request is presented via a client computing platform associated with the first user.

22 Claims, 4 Drawing Sheets

(56) References Cited

U.S. PATENT DOCUMENTS

| | | |
|---|---|---|
| 7,020,697 B1 | 3/2006 | Goodman |
| 7,039,596 B1 | 5/2006 | Lu |
| 7,039,654 B1 | 5/2006 | Eder |
| 7,086,062 B1* | 8/2006 | Faour .................... G06Q 10/10 |
| | | 718/100 |
| 7,146,326 B1 | 12/2006 | White |
| 7,155,400 B1 | 12/2006 | Jilk |
| 7,349,920 B1 | 3/2008 | Feinberg |
| 7,401,131 B2 | 7/2008 | Robertson |
| 7,418,482 B1 | 8/2008 | Lusher |
| 7,428,723 B2 | 9/2008 | Greene |
| 7,640,511 B1 | 12/2009 | Keel |
| 7,644,145 B2 | 1/2010 | Rockwell |
| 7,676,542 B2 | 3/2010 | Moser |
| 7,702,532 B2 | 4/2010 | Vigil |
| 7,778,866 B2 | 8/2010 | Hughes |
| RE41,737 E | 9/2010 | Leem |
| 7,792,795 B1 | 9/2010 | Swartz |
| 7,805,327 B1 | 9/2010 | Schulz |
| 7,831,978 B2 | 11/2010 | Schaad |
| 7,840,943 B2 | 11/2010 | Volkov |
| 7,917,855 B1 | 3/2011 | Satish |
| 7,941,453 B1 | 5/2011 | Scheevel |
| 7,945,469 B2 | 5/2011 | Cohen |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1* | 8/2013 | Merwarth ............ G06Q 10/103 |
| | | 718/100 |
| 8,527,287 B1 | 9/2013 | Bhatia |
| 8,554,832 B1 | 10/2013 | Moskovitz |
| 8,572,477 B1 | 10/2013 | Moskovitz |
| 8,626,547 B2 | 1/2014 | Hirano |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,785,445 B2 | 10/2017 | Mitsui |
| 9,842,312 B1* | 12/2017 | Rosati ............ G06Q 10/063114 |
| 9,949,681 B2 | 4/2018 | Badenes |
| 9,953,282 B2* | 4/2018 | Shaouy .......... G06Q 10/063116 |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 11,095,468 B1 | 8/2021 | Pandey |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0143594 A1* | 10/2002 | Kroeger ............... G06Q 10/109 |
| | | 705/7.15 |
| 2003/0028595 A1 | 2/2003 | Vogt |
| 2003/0036934 A1 | 2/2003 | Ouchi |
| 2003/0041317 A1 | 2/2003 | Sokolov |
| 2003/0097410 A1 | 5/2003 | Atkins |
| 2003/0126001 A1* | 7/2003 | Northcutt ............... G06Q 10/10 |
| | | 705/7.15 |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0167736 A1 | 7/2006 | Weiss |
| 2006/0190391 A1* | 8/2006 | Cullen ................... G06Q 10/10 |
| | | 705/37 |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0120129 A1 | 5/2008 | Seubert |
| 2008/0126930 A1 | 5/2008 | Scott |

(56) References Cited

U.S. PATENT DOCUMENTS

| | | |
|---|---|---|
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1* | 9/2008 | Balon ............... G06Q 10/06313 |
| | | 705/7.23 |
| 2008/0222566 A1 | 9/2008 | Daughtrey |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2010/0005087 A1 | 1/2010 | Basco |
| 2010/0070888 A1 | 3/2010 | Watabe |
| 2010/0088137 A1* | 4/2010 | Weiss ............... G06Q 10/0633 |
| | | 705/7.27 |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1* | 1/2011 | Barber-Mingo ....... G06Q 10/06 |
| | | 706/47 |
| 2011/0054968 A1 | 3/2011 | Galaviz |
| 2011/0055177 A1 | 3/2011 | Chakra |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1* | 6/2011 | Barney ................. G06Q 10/06 |
| | | 705/7.13 |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1* | 5/2012 | Culver ................. G06Q 10/067 |
| | | 709/205 |
| 2012/0117499 A1 | 5/2012 | Mori |
| 2012/0123835 A1* | 5/2012 | Chu .................... G06Q 30/0239 |
| | | 705/14.12 |
| 2012/0131191 A1 | 5/2012 | May |
| 2012/0158946 A1* | 6/2012 | Shafiee ............... G06Q 10/103 |
| | | 709/224 |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1* | 11/2012 | Maresh ............. G06Q 10/0631 |
| | | 718/103 |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1* | 1/2013 | Lee ..................... G06Q 10/101 |
| | | 715/751 |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1* | 6/2013 | Van Der Ploeg ...... G06Q 10/06 |
| | | 705/301 |
| 2013/0151604 A1 | 6/2013 | Ranade |
| 2013/0173486 A1 | 7/2013 | Peters |
| 2013/0179208 A1 | 7/2013 | Chung |
| 2013/0179799 A1* | 7/2013 | Savage ............... G06Q 10/103 |
| | | 715/751 |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0254299 A1 | 9/2013 | Burshtein |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Brian |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1* | 4/2014 | Savage ................... H04L 43/00 |
| | | 709/224 |
| 2014/0156539 A1 | 6/2014 | Brunet |
| 2014/0165001 A1 | 6/2014 | Shapiro |
| 2014/0172478 A1* | 6/2014 | Vadasz ........... G06Q 10/063114 |
| | | 705/7.15 |
| 2014/0200944 A1 | 7/2014 | Henriksen |
| 2014/0208325 A1* | 7/2014 | Chen ................... G06Q 10/107 |
| | | 718/102 |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De et al. |
| 2014/0257894 A1 | 9/2014 | Melahn |
| 2014/0279294 A1 | 9/2014 | Field-Darragh |
| 2014/0288987 A1* | 9/2014 | Liu ................. G06Q 10/063114 |
| | | 705/7.15 |
| 2014/0310047 A1 | 10/2014 | De |
| 2014/0310051 A1 | 10/2014 | Meng |
| 2014/0350997 A1 | 11/2014 | Holm |

(56) References Cited

U.S. PATENT DOCUMENTS

| | | | |
|---|---|---|---|
| 2014/0364987 A1 | 12/2014 | Shikano | |
| 2015/0006448 A1* | 1/2015 | Gupta | G06Q 10/063114 706/12 |
| 2015/0007058 A1 | 1/2015 | Wooten | |
| 2015/0012330 A1 | 1/2015 | Sugiura | |
| 2015/0052437 A1 | 2/2015 | Crawford | |
| 2015/0058053 A1 | 2/2015 | De | |
| 2015/0113540 A1 | 4/2015 | Rabinovici | |
| 2015/0134393 A1 | 5/2015 | De | |
| 2015/0153906 A1 | 6/2015 | Liao | |
| 2015/0213411 A1 | 7/2015 | Swanson | |
| 2015/0215256 A1 | 7/2015 | Ghafourifar | |
| 2015/0262111 A1 | 9/2015 | Yu | |
| 2015/0294245 A1 | 10/2015 | Nagar | |
| 2015/0312375 A1 | 10/2015 | Valey | |
| 2015/0317595 A1* | 11/2015 | De | G06F 9/4843 705/7.15 |
| 2015/0339006 A1 | 11/2015 | Chaland | |
| 2015/0363733 A1 | 12/2015 | Brown | |
| 2015/0379472 A1 | 12/2015 | Gilmour | |
| 2016/0012368 A1 | 1/2016 | O'Connell | |
| 2016/0048408 A1 | 2/2016 | Madhu | |
| 2016/0048786 A1 | 2/2016 | Fukuda | |
| 2016/0063192 A1 | 3/2016 | Johnson | |
| 2016/0063449 A1 | 3/2016 | Duggan | |
| 2016/0072750 A1 | 3/2016 | Kass | |
| 2016/0110670 A1 | 4/2016 | Chatterjee | |
| 2016/0124775 A1 | 5/2016 | Ashtiani | |
| 2016/0140474 A1 | 5/2016 | Vekker | |
| 2016/0140501 A1* | 5/2016 | Figlin | G06Q 10/103 705/7.15 |
| 2016/0147773 A1 | 5/2016 | Smith | |
| 2016/0147846 A1 | 5/2016 | Smith | |
| 2016/0148157 A1 | 5/2016 | Walia | |
| 2016/0180277 A1 | 6/2016 | Skiba | |
| 2016/0180298 A1 | 6/2016 | McClement | |
| 2016/0188145 A1 | 6/2016 | Vida | |
| 2016/0224939 A1 | 8/2016 | Chen | |
| 2016/0234391 A1 | 8/2016 | Wolthuis | |
| 2016/0275436 A1 | 9/2016 | Kurjanowicz | |
| 2016/0300024 A1 | 10/2016 | Janssen | |
| 2016/0313934 A1 | 10/2016 | Isherwood | |
| 2016/0328217 A1 | 11/2016 | Hagerty | |
| 2016/0342927 A1 | 11/2016 | Reznik | |
| 2017/0004213 A1 | 1/2017 | Cunico | |
| 2017/0009387 A1 | 1/2017 | Ge | |
| 2017/0017364 A1 | 1/2017 | Kekki | |
| 2017/0017924 A1* | 1/2017 | Kashiwagi | G06Q 10/103 |
| 2017/0039503 A1 | 2/2017 | Jones | |
| 2017/0061341 A1* | 3/2017 | Haas | G06Q 30/0283 |
| 2017/0068933 A1* | 3/2017 | Norton | G06Q 10/06398 |
| 2017/0093874 A1 | 3/2017 | Uthe | |
| 2017/0099296 A1 | 4/2017 | Fisher | |
| 2017/0103369 A1 | 4/2017 | Thompson | |
| 2017/0116552 A1* | 4/2017 | Deodhar | G06Q 10/06316 |
| 2017/0132200 A1* | 5/2017 | Noland | G06F 40/186 |
| 2017/0147960 A1 | 5/2017 | Jahagirdar | |
| 2017/0153799 A1 | 6/2017 | Hoyer | |
| 2017/0177671 A1 | 6/2017 | Allgaier | |
| 2017/0185592 A1 | 6/2017 | Frei | |
| 2017/0192642 A1 | 7/2017 | Fishman | |
| 2017/0206217 A1* | 7/2017 | Deshpande | G06F 16/1844 |
| 2017/0249577 A1* | 8/2017 | Nishikawa | G06Q 10/06311 |
| 2017/0316367 A1 | 11/2017 | Candito | |
| 2017/0317898 A1 | 11/2017 | Candito | |
| 2017/0323233 A1* | 11/2017 | Bencke | G06N 20/00 |
| 2017/0323267 A1* | 11/2017 | Baek | G06Q 10/063114 |
| 2017/0323350 A1 | 11/2017 | Laderer | |
| 2017/0344754 A1 | 11/2017 | Kumar | |
| 2017/0346861 A1 | 11/2017 | Pearl | |
| 2018/0032524 A1 | 2/2018 | Byron | |
| 2018/0052943 A1 | 2/2018 | Hui | |
| 2018/0053127 A1 | 2/2018 | Boileau | |
| 2018/0059910 A1 | 3/2018 | Wooten | |
| 2018/0060785 A1 | 3/2018 | Carnevale | |
| 2018/0060818 A1 | 3/2018 | Ishiyama | |
| 2018/0063063 A1 | 3/2018 | Yan | |
| 2018/0068271 A1 | 3/2018 | Abebe | |
| 2018/0075387 A1 | 3/2018 | Kulkarni | |
| 2018/0088754 A1 | 3/2018 | Psenka | |
| 2018/0089625 A1 | 3/2018 | Rosati | |
| 2018/0095938 A1 | 4/2018 | Monte | |
| 2018/0131649 A1* | 5/2018 | Ma | H04L 51/00 |
| 2018/0157477 A1 | 6/2018 | Johnson | |
| 2018/0165610 A1 | 6/2018 | Dumant | |
| 2018/0173386 A1 | 6/2018 | Adika | |
| 2018/0189706 A1* | 7/2018 | Newhouse | G06Q 10/101 |
| 2018/0189736 A1 | 7/2018 | Guo | |
| 2018/0225795 A1* | 8/2018 | Napoli | G06Q 10/06316 |
| 2018/0247352 A1 | 8/2018 | Rogers | |
| 2018/0260081 A1 | 9/2018 | Beaudoin | |
| 2018/0262620 A1 | 9/2018 | Wolthuis | |
| 2018/0285471 A1 | 10/2018 | Hao | |
| 2018/0316636 A1 | 11/2018 | Kamat | |
| 2018/0331842 A1 | 11/2018 | Faulkner | |
| 2018/0357049 A1 | 12/2018 | Epstein | |
| 2018/0367483 A1 | 12/2018 | Rodriguez | |
| 2018/0373804 A1 | 12/2018 | Zhang | |
| 2019/0005048 A1 | 1/2019 | Crivello | |
| 2019/0018552 A1 | 1/2019 | Bloy | |
| 2019/0034057 A1 | 1/2019 | Rudchenko | |
| 2019/0068390 A1 | 2/2019 | Gross | |
| 2019/0079909 A1 | 3/2019 | Purandare | |
| 2019/0080289 A1 | 3/2019 | Kreitler | |
| 2019/0095839 A1 | 3/2019 | Itabayashi | |
| 2019/0095846 A1 | 3/2019 | Gupta | |
| 2019/0102700 A1 | 4/2019 | Babu | |
| 2019/0138583 A1 | 5/2019 | Silk | |
| 2019/0138589 A1 | 5/2019 | Udell | |
| 2019/0138961 A1 | 5/2019 | Santiago | |
| 2019/0139004 A1 | 5/2019 | Vukovic | |
| 2019/0147386 A1 | 5/2019 | Balakrishna | |
| 2019/0187987 A1 | 6/2019 | Fauchère | |
| 2019/0213509 A1 | 7/2019 | Burleson | |
| 2019/0265821 A1 | 8/2019 | Pearl | |
| 2019/0340296 A1 | 11/2019 | Cunico | |
| 2019/0340574 A1 | 11/2019 | Ekambaram | |
| 2019/0347094 A1 | 11/2019 | Sullivan | |
| 2019/0347126 A1 | 11/2019 | Bhandari | |
| 2019/0370320 A1 | 12/2019 | Kalra | |
| 2020/0019907 A1 | 1/2020 | Notani | |
| 2020/0059539 A1 | 2/2020 | Wang | |
| 2020/0065736 A1 | 2/2020 | Relangi | |
| 2020/0162315 A1 | 5/2020 | Siddiqi | |
| 2020/0193556 A1 | 6/2020 | Jin | |
| 2020/0219061 A1 | 7/2020 | Guo | |
| 2020/0233879 A1 | 7/2020 | Papanicolaou | |
| 2020/0328906 A1 | 10/2020 | Raghavan | |
| 2020/0344253 A1 | 10/2020 | Kurup | |
| 2021/0110347 A1 | 4/2021 | Khalil | |
| 2021/0136012 A1 | 5/2021 | Barbitta | |
| 2021/0232282 A1 | 7/2021 | Karpe | |
| 2021/0319389 A1 | 10/2021 | Jafari | |
| 2021/0320891 A1 | 10/2021 | Rosenstein | |
| 2021/0342786 A1 | 11/2021 | Jiang | |
| 2021/0382734 A1 | 12/2021 | Rosenstein | |
| 2022/0019320 A1 | 1/2022 | Sabo | |
| 2022/0058548 A1 | 2/2022 | Garg | |
| 2022/0075792 A1 | 3/2022 | Koch | |
| 2022/0078142 A1 | 3/2022 | Cameron | |
| 2022/0158859 A1 | 5/2022 | Raghavan | |
| 2022/0171637 A1 | 6/2022 | Sabo | |
| 2022/0188715 A1 | 6/2022 | Cheng | |
| 2022/0214787 A1 | 7/2022 | Karpe | |
| 2022/0215315 A1 | 7/2022 | Sabo | |
| 2022/0343282 A1 | 10/2022 | Hood | |

FOREIGN PATENT DOCUMENTS

| | | |
|---|---|---|
| CN | 102378975 B | 5/2015 |
| WO | 2015036817 A1 | 3/2015 |

(56) References Cited

FOREIGN PATENT DOCUMENTS

| | | |
|---|---|---|
| WO | 2015123751 A1 | 8/2015 |
| WO | 2020006634 A1 | 1/2020 |

OTHER PUBLICATIONS

"U.S. Appl. No. 14/584,750, Examiner Interview Summary dated Feb. 25, 2016", 3 pgs.
"U.S. Appl. No. 14/584,750, Non Final Office Action dated Aug. 28, 2015", 21 pgs.
"U.S. Appl. No. 14/584,750, Notice of Allowance dated Mar. 28, 2016", 8 pgs.
"U.S. Appl. No. 14/584,750, Response filed Feb. 29, 2015 to Non Final Office Action dated Aug. 28, 2015", 16 pgs.
"U.S. Appl. No. 14/584,850, Final Office Action dated Sep. 1, 2017", 31 pgs.
"U.S. Appl. No. 14/584,850, Non Final Office Action dated Jan. 10, 2017", 9 pgs.
"U.S. Appl. No. 14/584,850, Response filed Apr. 10, 2017 to Non Final Office Action dated Jan. 10, 2017", 13 pgs.
Biggs, "GateGuru Relaunches With New Ways to Streamline Your Travel Experience", Techcrunch, (Apr. 26, 2013), 3 pgs.
www.cogmotive.com/blog/author/alan Alan Byrne: "Creating a company Shared Calendar in Office 365"; pp. 1-17; Sep. 10, 2013.
Asana Demo and Product Tour, you tube excerpt, Dec. 7, 2017 https://www.youtube.com/watch?v=IMAFWVLGFyw (Year: 2017) (16 pages).
Asana integrations, Asana tutorial, youtube, excerpt, Nov. 16, 2016 https://www.youtube.com/watch?v=hBiQ7DJNinE (Year: 2016) (21 pages).
Asana Workload and Portfolios,youtube,excerpt, Aug. 1, 2019 https://www.youtube.com/watch?v=7XkNcfFDG6M (Year: 2019) (20 pages).
Asana YouTube channel, list of all product videos, Nov 19, 2014-Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana,Manage your team capacity with Workload, youtube, excerpt, Aug. 1, 2019 https://www.youtube.com/watch?v=2ufXyZDzZnA&list=PLJFG93oi0wJAi UwyOhlGWHdtJzJrzylBv (Year: 2019) (1 page).
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv3o (Year: 2017) (24 pages).
How to Asana, Planning with Asana calendar, youtube excerpt, Feb. 14, 2017 https://www.youtube.com/watch?v=w8t6KYiVPyc (Year: 2017) (19 pages).
How to Asana, Using Asana for task management, youtube, excerpt, Feb. 7, 2017 https://wwW.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRI?d_WM4Bc (Year: 2018) (2 pages).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
Command and control, Wikipedia, archives org, Mar. 16, 2018 https://web.archive.org/web/20180316193655/https://en.wikipedia.org/wiki/Command_and_control (Year: 2018), 6 pages.
"How to Asana: Inviting teammates to Asana." YouTube, Asana, Mar. 21, 2017, https://www.youtube.com/watch?v=TLOruY1KyxU (Year: 2017), 13 pages.
Critical chain project management, Wikipedia, archives org, Dec. 17, 2016 https://web.archive.Org/web/20161217090326/https://en.wikipedia.org/wiki/Critical_chain_project_management (Year: 2016) 5 pages.
Critical Path Method, Wikipedia, archives org, Sep. 19, 2017 https://web.archive.Org/web/20170919223814/https://en.wikipedia.org/wiki/Critical_path_method (Year: 2017) 6 pages.
Fruhlinger, Joshua. "The Best to-do ListApps for Feeling Productive; With the right app, feeling productive can be just as gratifying as actually getting things done" Wall Street Journal (Online); New York, N.Y. [New York, N.Y] Nov. 8, 2013 (Year: 2013) 4 pages.
Www.asana.com (as retrieved from https://web.archive.0rg/web/20160101054536/https://asana.com/press and https://web.archive.Org/web/20160101054527/https://asana.com/product) (Year: 2016) 15 pages.
Hartmann, "TimeProjectscheduling with resource capacities and requests varying with time: a case study," 2013, Flexible services and manufacturing journal, vol. 25, No. 1, pp. 74-93 (Year: 2013).
Paul Minors, How to automate your tasks, youtube excerpts, Oct. 18, 2019 https://www.youtube.com/watch?v=lwF9XyUQrzw (Year: 2019).
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).
Tiburca, Andrew) Best Team Calendar Applications for 2018-Toggl https://toggl.com/blog/best-team-calendar-applications-for-2018 (Year: 2017).
Asset, F., Cassius, T. S., & Maria, T. S. (2018). Confrontation between techniques of time measurement. Journal of Manufacturing Technology Management, 29(5), 789-810. (Year: 2018).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).
Macro, computer science, Wikipedia, archives org Feb. 11, 2020 http://web.archive.org/web/20200211082902/https://en.wikipedia.org/wiki/Macro_(computer_science) (Year: 2020).
Dawei Li, "Deepcham: Collaborative Edge-Mediated Adaptive Deep Learning for Mobile Object Recognition", 2016, IEEE/ACM, pp. 64-76. (Year: 2016).

\* cited by examiner

SYSTEMS AND METHODS FOR GENERATING STATUS REQUESTS FOR UNITS OF WORK

FIELD OF THE DISCLOSURE

The present disclosure relates to systems and methods for generating status requests for units of work.

BACKGROUND

Collaboration environments enable users to assign projects, tasks, or other assignments to assignees to complete. Such collaboration environments enable users to work in a more organized and efficient manner. However, upon completion, users often forget to update the projects and/or tasks to indicate they are complete. As such, project and/or task supervisors and managers are left in the dark and unaware of the true status of the project and/or task.

SUMMARY

In typical online collaboration environments for managing workflow, project/team leaders often have to follow-up and/or checked off when individual tasks are completed because assignees often forget to do so. Generating status requests for units of work as described herein help prevent project/team leaders from having to follow-up with individual assignees. Instead, units of work that might need status updates are identified and status requests prompting updates from users are generated and presented to the users. In some implementations, users may be incentivized to provide user input responding to status requests via incentive offers.

One aspect of the present disclosure relates to a system configured for generating status requests for units of work. The system may include one or more hardware processors configured by machine-readable instructions. The processor(s) may be configured to manage environment state information maintaining a collaboration environment. The environment state information may include values of user parameters and values of work unit parameters. The values of the user parameters may be organized in user records corresponding to users interacting with and viewing the collaboration environment and the values of the work unit parameters are organized in work unit records corresponding to units of work managed, created, and/or assigned within the collaboration environment. Managing the environment state information may include updating the values of the work unit parameters responsive to user interactions with the units of work. The values of the work unit parameters for first unit of work may be updated responsive to one or more users interacting with the first unit of work.

The processor(s) may be configured to identify one or more work unit records having potentially incorrect status values for a status parameter. The one or more work unit records having potentially incorrect status values may be identified based on the values of the work unit parameters such that a first work unit record having a potentially incorrect first status value is identified based on first values for the work unit parameters associated with the first unit of work. The processor(s) may be configured to generate status requests prompting user input to update the potentially incorrect status values for the one or more work unit records identified. The status requests may include a first status request prompting user input from a first user associated with the first unit of work to update the potentially incorrect first status value. The processor(s) may be configured to effectuate presentation of the status requests, such that the first status request is presented via a client computing platform associated with the first user.

In some implementations, a system configured for generating status requests for units of work, may include one or more of: one or more servers, one or more client computing platforms, and/or other components. The one or more servers may be configured to communicate with one or more client computing platforms according to a client/server architecture and/or other architecture. The one or more servers and/or client computing platforms may include one or more physical processors configured to execute one or more computer program components. The computer program components may include one or more of an environment state component, an identification component, a status request component, a presentation component, a status update component, an incentive component, and/or other instruction components.

The environment state component may be configured to manage environment state information maintaining a collaboration environment. The environment state information may include values of user parameters, values of work unit parameters, and/or values of other parameters. The values of the user parameters may be organized in user records corresponding to users interacting with and/or viewing the collaboration environment. The values of the work unit parameters may be organized in work unit records corresponding to units of work managed, created, and/or assigned within the collaboration environment. Managing the environment state information may include updating the values of the work unit parameters. The values of the work unit parameters may be updated responsive to user interactions with the units of work. For example, the values of the work unit parameters for first unit of work may be updated responsive to one or more users interacting with the first unit of work. In some implementations, interacting with the first unit of work may include working on the first unit of work, uploading a file associated with the first unit of work, moving on to another unit of work, not working on the unit of work (e.g., the unit of work being idle for a given period of time), the user viewing and/or clicking on the unit of work, and/or other interactions associated with the unit of work.

The identification component may be configured to identify one or more work unit records having potentially incorrect status values for a status parameter. A work unit record may have a potentially incorrect status value for a status parameter if, for example, the status of the associated work unit has not likely been updated and/or likely needs to be updated. The one or more work unit records having potentially incorrect status values may be identified based on the values of the work unit parameters. For example, a first work unit record having a potentially incorrect first status value may be identified based on first values for the work unit parameters associated with the first unit of work. In some implementations, the first work unit record may be identified based on the values for the work unit parameters associated with other units of work.

The status request component may be configured to generate status requests prompting user input to update the potentially incorrect status values for the one or more work unit records identified. The status requests may include, for example, a first status request prompting user input from a first user associated with the first unit of work to update the potentially incorrect first status value. In some implementations, the status requests may be automatically generated responsive to the environment state component updating the values of the work unit parameters. In some implementations, a second user may request a status update such that the first status request may be generated responsive to receiving an update request from a client computing platform associated with a second user.

The presentation component may be configured to effectuate presentation of the status requests. For example, the first status request may be presented within a graphical user interface presented via a client computing platform associated with the first user.

The status update component may be configured to update the status of the first unit of work. The status of the first unit of work may be updated responsive to receiving user input. In some implementations, for example, the user input may include approval of the first suggested status update, an indication of a status update for the first unit of work, and/or other user input. In some implementations, status of the component may be configured to determine a first suggested status update for the first status request based on the first values for the work unit parameters associated with the first unit of work. The first suggested status update may be included in the first status request. As such, for example, presentation component may be configured to effectuate presentation of the first suggested status update with the first status request.

In some implementations, the incentive component may configured to generate an incentive offer. The incentive offer may indicate an incentive for the first user based on the first values for the work unit parameters associated with the first unit of work. The presentation component may configured to effectuate presentation of the incentive offer to the first user via the first client computing platform. The incentive component may be configured to provide the incentive to the first user responsive to receiving the user input responsive to the first status request from the first user. As such, for example, the user may receive an incentive for updating the status associated with the first unit of work and/or responding to the first status request for the first unit of work.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
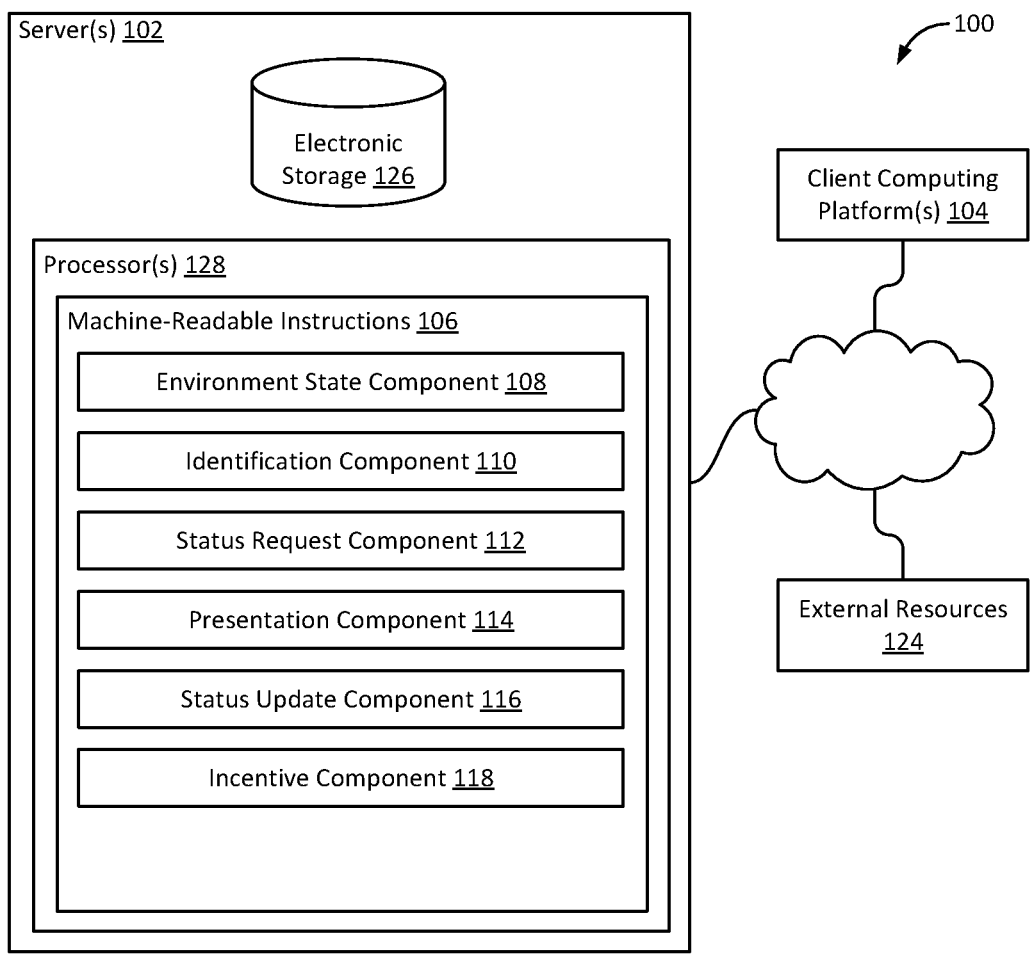
FIG. 1 shows a system configured for generating status requests for units of work, in accordance with one or more implementations.

FIG. 1 illustrates a system 100 configured for generating status requests for units of work, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of an environment state component 108, an identification component 110, a status request component 112, a presentation component 114, a status update component 116, an incentive component 118, and/or other instruction components.

Environment state component 108 may be configured to manage environment state information maintaining a collaboration environment. The environment state information may include values of user parameters and values of work unit parameters. By way of non-limiting example, the values of the user parameters may be organized in user records corresponding to users interacting with and viewing the collaboration environment. The values of the work unit parameters may be organized in work unit records corresponding to units of work managed, created, and/or assigned within the collaboration environment. A given work unit may have one or more assignees and/or team members working on the given work unit. Work units may include one or more to-do items, action items, objectives, and/or other units of work one or more users should accomplish and/or plan on accomplishing. Units of work may be created by a given user for the given user and/or created by the given user and assigned to one or more other users. A given unit of work may include one or more projects, tasks, sub-tasks, and/or other units of work possibly assigned to and/or associated with one or more users.

The work unit parameters may, by way of non-limiting example, include one or more of: one or more units of work, one or more user comment parameters (e.g., a creator, a recipient, one or more followers, one or more other interested parties, content, one or more times, up-votes, other hard-coded responses, etc.), a unit of work name, a unit of work description, one or more unit of work dates (e.g., a start date, a due date, a completion date, and/or other unit of work dates), one or more members associated with a unit of work (e.g., an owner, one or more other project/task members, member access information, and/or other unit of work members and/or member information), a status parameter (e.g., an update, a hardcoded status update, a completed/ uncomplete/mark complete, a measured status, a progress indication, quantity of sub-work units remaining for a given unit of work, completed work units in a given project, and/or other status parameter), one or more interaction parameters (e.g., indicating a given unit of work is being worked on/was worked on, given work unit of work was viewed, a given unit of work was selected, how long the given unit of work has been idle, a last interaction parameter indicating when and what user last interacted with the given unit of work, users that interacted with the given unit of work, and/or otherer interaction parameters indicating sources of the interactions, context of the interactions, content of the interactions and/or time for the interactions), one or more file attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, sub-tasks within a task, etc.,), state of a workspace for a given unit of work (e.g., application state parameters, application status, application interactions, user information, and/or other parameters related to the state of the workspace for a unit of work), dependencies between one or more work units, one or more custom fields (e.g., priority, cost, stage, and/or other custom fields), other work unit parameters for the given work units, and/or other work unit parameters, and/or user parameters for one or more users and/or work units the given project is associated with.

The user parameters associated with the users interacting with and/or viewing the collaboration environment may include parameters describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The user parameters may, by way of non-limiting example, include one or more of: a user name, a group parameter, a subset parameter, a user account, a user role, a user department, descriptive user content, a to-email, a from-email, a photo, an organization, a workspace, one or more projects (which may include project parameters defined by one or more work unit records), one or more items of work (which may include one or more unit of work parameters defined by one or more unit of work records), one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, etc.), one or more notification settings, one or more progress parameters, status information for one or more work units the user is associated with, one or more statistics related to a given user (e.g., how many units of work the user has completed, how quickly the user completed the units of work, how quickly the user completes certain types of work units, the efficiency of the user, bandwidth of the user, activity level of the user, etc.), application access information (e.g., username/password for one or more third-party applications), one or more favorites and/or priorities, workload information, schedule information, historical information, other user parameters for the given user, and/or other user parameters and/or work unit parameters, for one or more work units the given user is associated with.

The environment state component 108 may be configured to update the values of the work unit parameters and/or the user parameters. Managing the environment state information may include updating the values of the work unit parameters. The values of the work unit parameters may be updated responsive to user interactions with the units of work. Responsive to a user interacting with a given unit of work, the value of the work unit parameters for the given unit of work may be updated. For example, the values of the work unit parameters for first unit of work may be updated responsive to one or more users interacting with the first unit of work. Interacting with the first unit of work may include one or more of working on the first unit of work, uploading a file associated with the first unit of work, moving on to another unit of work, not working on the unit of work (e.g., the unit of work being idle for a given period of time), the user viewing and/or clicking on the unit of work, and/or other interactions associated with the unit of work.

Identification component 110 may be configured to identify one or more work unit records having potentially incorrect status values for a status parameter. An incorrect status value for status parameter may include a status value that has not been updated and/or a status value that does not accurately reflect the status of the unit of work. The one or more work unit records having potentially incorrect status values may be identified based on the values of the work unit parameters. For example, the first work unit record is identified as having a potentially incorrect status value. A first work unit record having a potentially incorrect first status value may be identified based on first values for the work unit parameters associated with the first unit of work. In some implementations, the first work unit record may be identified as having a potentially incorrect first status value based on the values for the work unit parameters associated with other units of work.

In some implementations, the values of the work unit parameters indicating that the first work unit record may have a potentially incorrect first status value may include a value for a file upload parameter. When users complete units of work or are close to completing units of work, they may upload one or more files associated with the units of work. As such, uploading a file may indicate the status value for the status parameter for the unit of work may be incorrect. Responsive to a user uploading a file associated with a given unit of work, state component 108 may be configured to update the file upload parameter for the given unit of work. Identification component 110 may be configured to identify the work unit record with the newly updated file upload parameter as a work unit record having a potentially incorrect status value.

In some implementations, the values of the work unit parameters indicating that the first work unit record may have a potentially incorrect first status value may include a value for a last interaction parameter corresponding to the first unit of work and/or a second unit of work. The values of a last interaction parameter for multiple units of work may be used to identify when a given user moves on to another unit of work from a first unit of work possibly indicating the first unit of work is actually complete. By way of non-limiting example, responsive to the value for a last interaction parameter corresponding to the first unit of work indicating the first user last interacted with the first unit of work before the value for the him last interaction parameter corresponding to the second unit of work indicates the first user last interacted with the second unit of work, identification component 110 may identify the first work unit record as having a potentially incorrect status value for a status parameter.

In some implementations, the values of the work unit parameters indicating that the first work unit record may have a potentially incorrect first status value may include parameter values for one or more interaction parameters. The interaction parameters may include, for example a last interaction parameter, an idle parameter (e.g., indicating a period of time and/or frequency the unit of work is idle and/or not being worked on by a user and/or a given user), an interaction level parameter (e.g., indicating the type of interaction and/or interaction level with the given unit of work, the frequency of interactions, and/or other levels of interaction), and/or other interaction parameters.

Status request component 112 may be configured to generate status requests prompting user input to update the potentially incorrect status values for the one or more work unit records identified. In some implementations, the status requests may be automatically generated by status request component 112. Status request component 112 may automatically generate the status requests for given units of work responsive to environment state component 108 updating the values of the work unit parameters associated with the given units of work. In some implementations, status requests may be initiated and/or triggered by another user (e.g., a manager, a project manager, a supervisor, assigning user, and/or other user). Status requests may include notifications and/or prompts for user input used to update the statuses the associated units of work. The user input may include a response to the status request indicating selection of the correct status for a given unit of work, approval of a suggested status update, and/or other user input.

For example, the status requests may include a first status request prompting user input from a first user associated with the first unit of work to update the potentially incorrect first status value. The first status request may be generated automatically and/or responsive to receiving an update request from a client computing platform associated with a second user. The user input may include approval of the first suggested status update and/or an indication of a status update for the first unit of work. The user input may include selection of a first status update for the first unit of work.

Presentation component 114 may be configured to effectuate presentation of the status requests. Status requests may be presented via graphical user interface displaying one or more client computing platforms associated with the users. In some implementations, presentation of the status requests may include presentation of one or more suggested status updates, options for user input (e.g., options for selection of the correct status and/or approval/denial of the correct status for a given unit of work) and/or other information and/or options. The first status request may be presented via a client computing platform associated with the first user.

Status update component 116 may be configured to update the status of one or more units of work responsive to receiving user input in response to the status requests. For example, status update component 116 may be configured to update the first status value for the first unit of work within the first work unit record.

In some implementations, status update component 116 may be configured to determine one or more suggested status updates for a given unit of work. The suggested status updates may include proposed status updates and/or options for a status update from which the user can select. For example, status update component 116 may be configured to determine a first suggested status update for the first status request based on the first values for the work unit parameters associated with the first unit of work. The first suggested status update may be included in the first status request.

In some implementations, incentive component 118 may be configured to generate incentive offers for users for updating and/or responding to status requests. The incentive offers may be determined based on the values for the work unit parameters associated with the given units of work. By way of non-limiting example, incentives for status requests associated with units of work that have been pending for a long time, involve a lot of users, are associated with higher level users (e.g., managers, project leads, team leaders, supervisors, etc.), and/or other characteristics indicating higher value and/or importance may have more value than incentive for status requests associated with units of work that have only been pending for short period of time, involve a single user, are associated with lower level users, and/or other characteristics indicating lower value and/or importance. Incentive component 118 may be configured to generate an incentive offer indicating an incentive for the first user based on the first values for the work unit parameters associated with the first unit of work.

Incentive component 118 may be configured to provide the incentive to one or more users responsive to receiving user input from the one or more users in response to the given status requests. In some implementations, incentive component 118 may be configured to provide the incentive to the first user responsive to receiving the user input in response to the first status request from the first user. The incentive may include an amount of consideration having some value within and/or external to the collaboration environment.

Returning to presentation component 114, presentation component 114 may be configured to effectuate presentation of one or more incentive offers for updating and/or provide a user input in response to the status update requests. As such, for example, presentation component 114 may be configured to effectuate presentation of an incentive offer to the first user via the first client computing platform.

Figure 2:
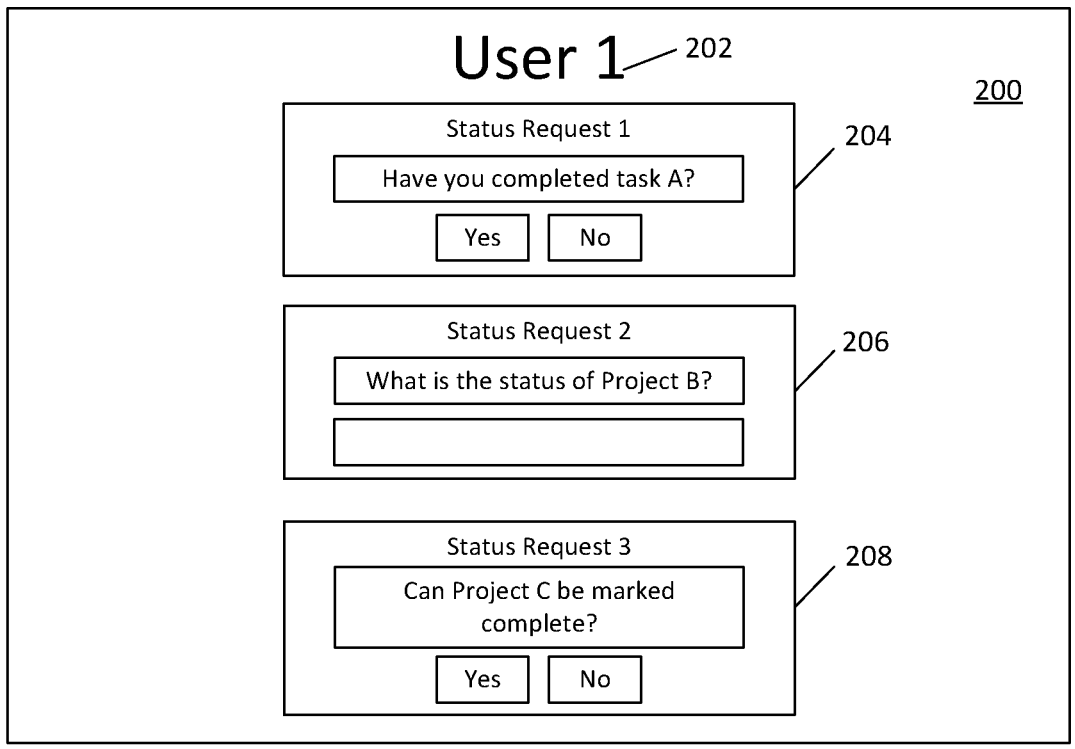
FIG. 2 illustrates an example graphical user interface presenting multiple status requests, in accordance with one or more implementations.

FIG. 2 illustrates an example graphical user interface presenting multiple status requests, in accordance with one or more implementations. Graphical user interface 200 may be configured to effectuate presentation of status request 1 204, status request 2 206, and/or status request 3 208. Status request 1 204 may include "yes" and "no" options for user input in response to status request 1 204. Status request 2 206 may include a text box for receiving user input in response to status request 2 2-6. Status request 3 208 may include a suggested status update (e.g., marking Project C complete) and request the user to improve and/or deny the suggested status update.

Figure 3:
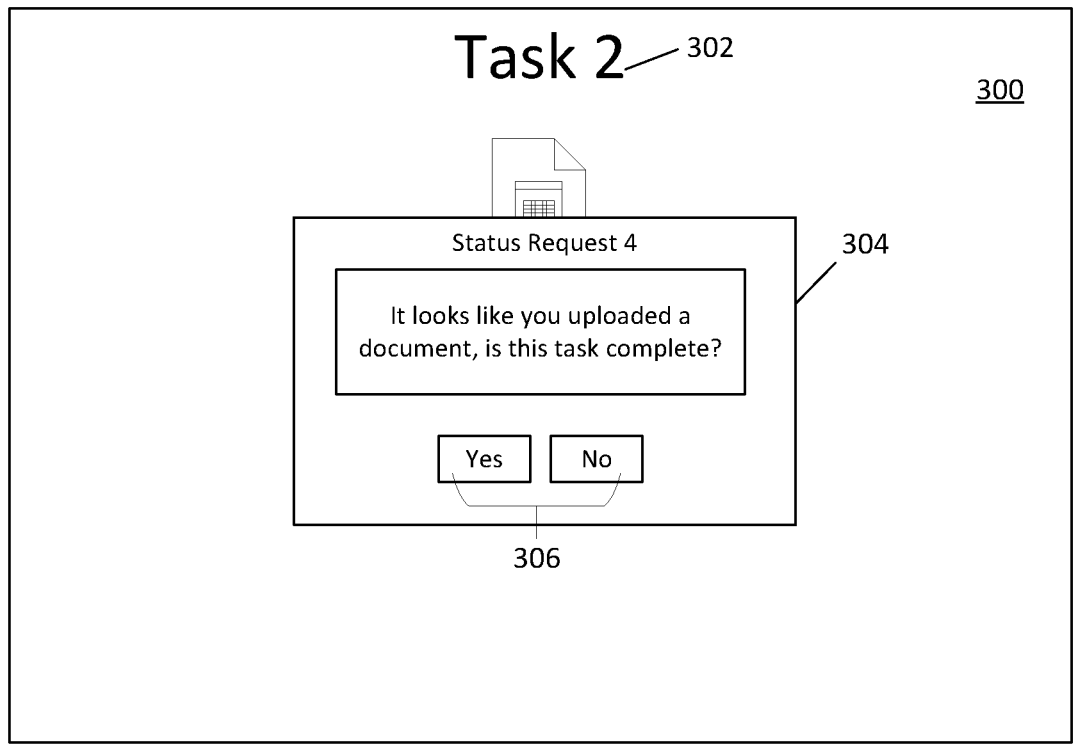
FIG. 3 illustrates an example graphical user interface presenting a status request, in accordance with one or more implementations.

FIG. 3 illustrates an example graphical user interface presenting a status request, in accordance with one or more implementations. Graphical user interface 300 may be configured to effectuate presentation of status request 4 304 associated with task 2 302. Status request 4 304 may be generated responsive to the values of the work unit parameters associated with task 2 indicating the work unit record associated with task 2 may have a potentially incorrect status value because the file upload parameter for tasks 2 was updated. Status request 4 304 may include "yes" and "no" options 306 for user input in response to status request 4 304.

Figure 4:
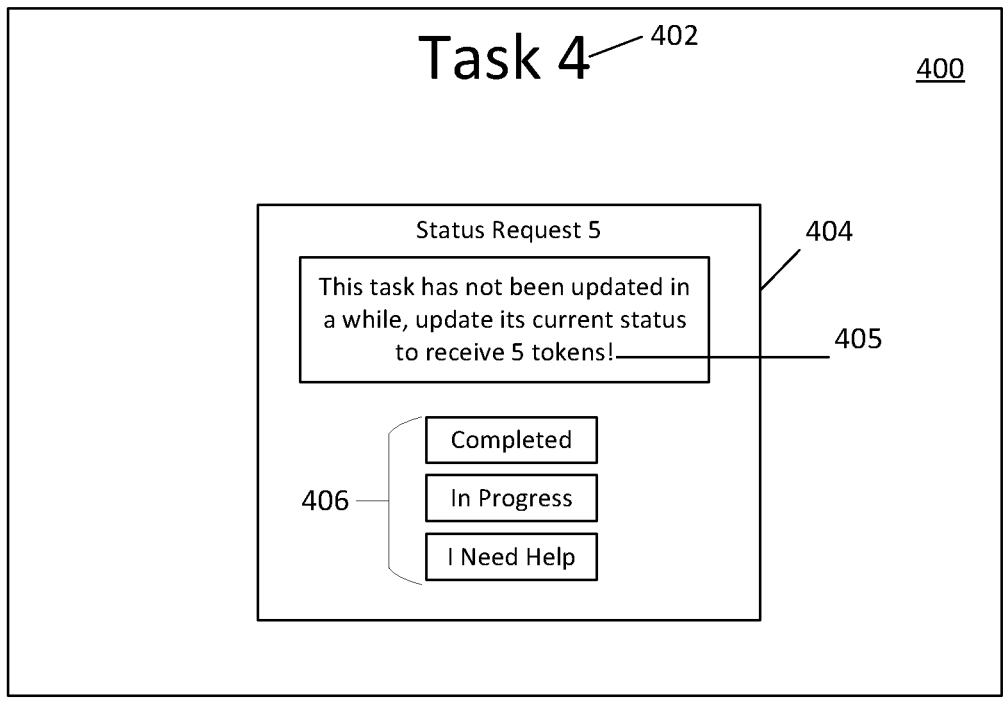
FIG. 4 illustrates an example graphical user interface presenting a status request and an incentive offer, in accordance with one or more implementations.

FIG. 4 illustrates an example graphical user interface presenting a status request, in accordance with one or more implementations. Graphical user interface 400 may be configured to effectuate presentation of status request 5 404 associated with task 4 402. Status request 5 404 may include an incentive offer 405 incentivizing the user to update the task to receive the incentive (e.g., 5 tokens). Responsive to the user selecting one of the input options 406 (e.g., "completed", "in progress", and/or "I need help"), the incentive (e.g., 5 tokens) may be provided to the user. The status for task 4 402 may be updated responsive to and/or based on the user selection of one of the input options (e.g., "completed", "in progress", and/or "I need help").

Figure 5:
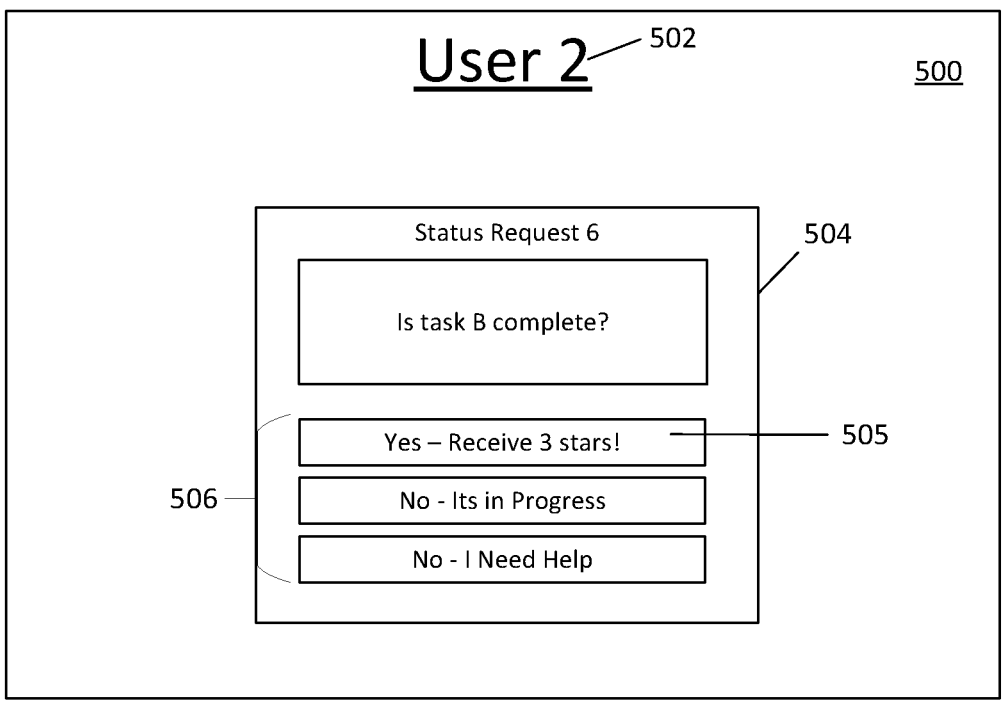
FIG. 5 illustrates an example graphical user interface presenting a status request and an incentive offer, in accordance with one or more implementations.

FIG. 5 illustrates an example graphical user interface presenting a status request, in accordance with one or more implementations. Graphical user interface 500 may be configured to effectuate presentation of status request 6 504. Status request 6 504 may include an incentive offer 505 incentivizing the user if task B is complete and the user selections the update option indicating task B is complete. update the task to receive the incentive (e.g., 5 tokens). Responsive to the user selecting one of the input options 506 (e.g., "Yes", "No—It's in progress", and/or "No—I need help"), the incentive (e.g., 3 stars) may be provided to the user. The status for task 6 may be updated responsive to and/or based on the user selection of one of the input options (e.g., "Yes", "No—It's in progress", and/or "No—I need help").

Returning to FIG. 1, in some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 108, 110, 112, 114, 116, and/or 118 and/or other components. Processor(s) 128 may be configured to execute components 108, 110, 112, 114, 116, and/or 118 and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, and/or 118 are illustrated in FIG. 1 as being implemented within a single processing unit, in implementations in which processor(s) 128 includes multiple processing units, one or more of components 108, 110, 112, 114, 116, and/or 118 may be implemented remotely from the other components. The description of the functionality provided by the different components 108, 110, 112, 114, 116, and/or 118 described below is for illustrative purposes, and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, and/or 118. As another example, processor(s) 128 may be configured to execute one or more additional components that may perform some or all of the functionality attributed below to one of components 108, 110, 112, 114, 116, and/or 118.

Figure 6:
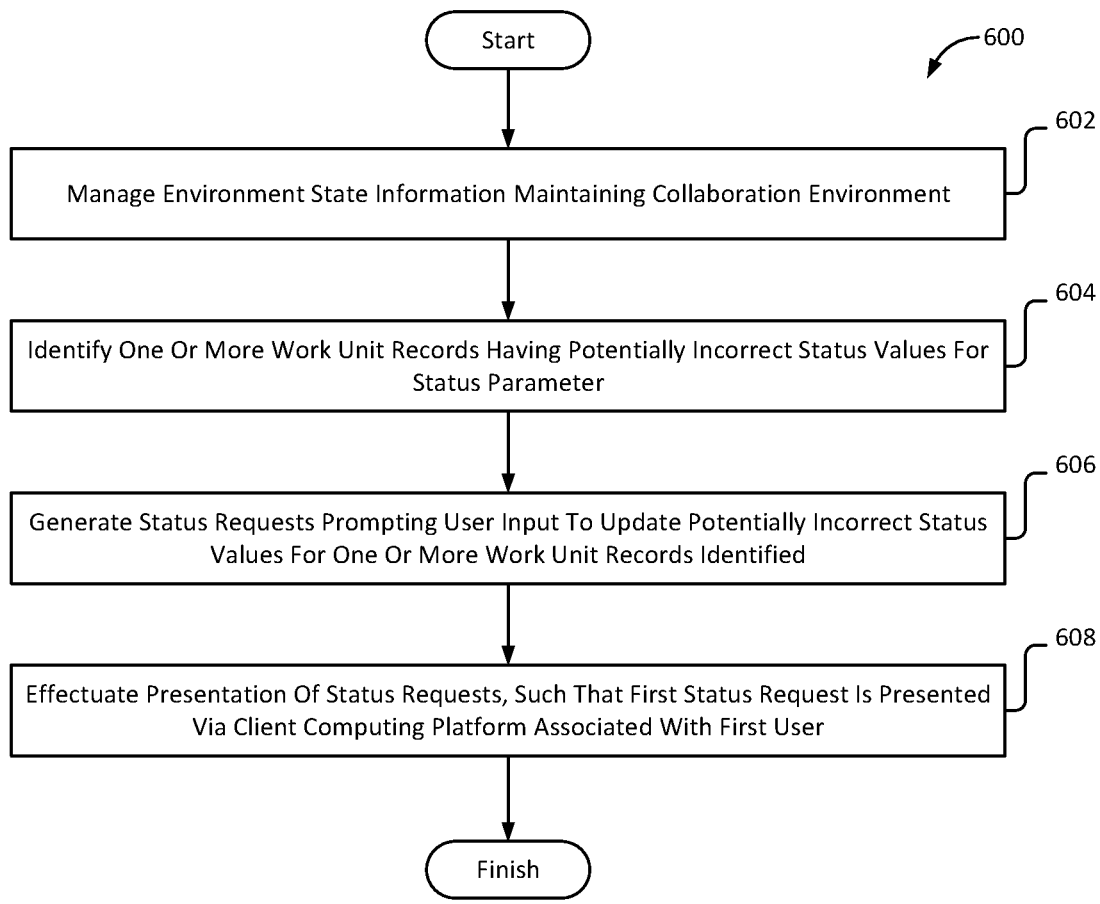
FIG. 6 illustrates a flow chart of a method for generating status requests for units of work, in accordance with one or more implementations.

FIG. 6 illustrates a method 600 for generating status requests for units of work, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

An operation 602 may include managing environment state information maintaining a collaboration environment. The environment state information may include values of user parameters and values of work unit parameters. The values of the user parameters may be organized in user records corresponding to users interacting with and viewing the collaboration environment and the values of the work unit parameters are organized in work unit records corresponding to units of work managed, created, and/or assigned within the collaboration environment. Managing the environment state information may include updating the values of the work unit parameters responsive to user interactions with the units of work. The values of the work unit parameters for first unit of work may be updated responsive to one or more users interacting with the first unit of work. Operation 602 may be performed by one or more hardware processors configured by machine-readable instructions including a component that is the same as or similar to environment state component 108, in accordance with one or more implementations.

An operation 604 may include identifying one or more work unit records having potentially incorrect status values for a status parameter. The one or more work unit records having potentially incorrect status values may be identified based on the values of the work unit parameters such that a first work unit record having a potentially incorrect first status value is identified based on first values for the work unit parameters associated with the first unit of work. Operation 604 may be performed by one or more hardware processors configured by machine-readable instructions including a component that is the same as or similar to identification component 110, in accordance with one or more implementations.

An operation 606 may include generating status requests prompting user input to update the potentially incorrect status values for the one or more work unit records identified. The status requests may include a first status request prompting user input from a first user associated with the first unit of work to update the potentially incorrect first status value. Operation 606 may be performed by one or more hardware processors configured by machine-readable instructions including a component that is the same as or similar to status request component 112, in accordance with one or more implementations.

An operation 608 may include effectuating presentation of the status requests, such that the first status request is presented via a client computing platform associated with the first user. Operation 608 may be performed by one or more hardware processors configured by machine-readable instructions including a component that is the same as or similar to presentation component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate status requests for units of work, the system comprising:

one or more hardware processors configured by machine-readable instructions to:

manage, by a server, environment state information maintaining a virtual collaboration environment, the environment state information including values of user parameters and work unit parameters, wherein the values of the user parameters are organized in user records corresponding to users interacting with and viewing the virtual collaboration environment, and the values of the work unit parameters are organized in work unit records corresponding to units of work managed, created, and/or assigned within the virtual collaboration environment, wherein individual units of work are individual action items individual ones of the users are to accomplish, wherein the users interact with and view the virtual collaboration environment via remotely located client computing platforms communicating with the server over an Internet connection, wherein managing the environment state information includes updating the values of the work unit parameters responsive to user interactions with the units of work, such that the values of the work unit parameters for a first unit of work are updated responsive to one or more of the users interacting with the first unit of work;

establish the Internet connection between the remotely located client computing platforms and the server;

identify, by the server, one or more of the work unit records having potentially incorrect status values for a status parameter for the individual units of work, status values characterizing status of the individual units of work, wherein the one or more of the work unit records having the potentially incorrect status values are identified based on the values of the work unit parameters such that a first work unit record having a potentially incorrect first status value is identified based on first values for the work unit parameters associated with the first unit of work;

generate, by the server, status requests prompting user input to update the potentially incorrect status values for the one or more of the work unit records, the status requests including a first status request prompting the user input from a first user associated with the first unit of work to update the potentially incorrect first status value;

effectuate communication of information from the server to the remotely located client computing platforms over the Internet connection so that the remotely located client computing platforms present a user interface of the virtual collaboration environment including the status requests, the status requests in the user interface including user-selectable input elements through which the users provide the user input to update the potentially incorrect status values, such that the first status request is presented via a first remotely located client computing platform associated with the first user, the first status request including a first user-selectable input element and a second user-selectable input element through which the first user provides the user input to update the potentially incorrect first status value;

obtain, at the server, user input information conveying the user input into the user interface at the remotely located client computing platforms b the users; and update, at the server, the potentially incorrect status values based on the user input information conveying the user input, such that responsive to the user input of the first user including selection of the first user-selectable input element, update the potentially incorrect first status value to a first updated value, and responsive to the user input of the first user including selection of the second user-selectable input element, update the potentially incorrect first status value to a second updated value.

2. The system of claim 1, wherein interacting with the first unit of work includes one or more of working on the first unit of work, and/or uploading a file associated with the first unit of work.

3. The system of claim 1, wherein the first work unit record is identified based on the values for the work unit parameters associated with other units of work.

4. The system of claim 1, wherein generating the status requests includes automatically generating the status requests responsive to updating the values of the work unit parameters.

5. The system of claim 1, wherein the first status request is generated responsive to receiving an update request from a second client computing platform associated with a second user.

6. The system of claim 1, wherein the one or more hardware processors are further configured by the machine-readable instructions to:

determine a first suggested status update for the first status request based on the first values for the work unit parameters associated with the first unit of work, wherein the first user-selectable input element conveys the first suggested status update.

7. The system of claim 6, wherein the user input of the first user including the selection of the first user-selectable input element conveys approval of the first suggested status update and/or an indication of a status update for the first unit of work.

8. The system of claim 1, wherein the one or more hardware processors are further configured by the machine-readable instructions to generate an incentive offer indicating an incentive for the first user based on the first values for the work unit parameters associated with the first unit of work.

9. The system of claim 8, wherein the one or more hardware processors are further configured by the machine-readable instructions to:

effectuate presentation of the incentive offer to the first user via the first remotely located client computing platform;

provide the incentive to the first user responsive to receiving the user put responsive to the first status request from the first user.

10. The system of claim 1, wherein the values of the work unit parameters indicating that the one or more of the work unit records have the potentially incorrect status values include the values of a file upload parameter and/or a last interaction parameter.

11. The system of claim 10, wherein the values of the work unit parameters indicating that the first work unit record has the potentially incorrect first status value include a value for the last interaction parameter corresponding to the first unit of work and/or a second unit of work, such that responsive to the value for the last interaction parameter corresponding to the first unit of work indicating the first user last interacted with the first unit of work before the value for the last interaction parameter corresponding to the second unit of work indicates the first user last interacted with the second unit of work, the first work unit record is identified as having the potentially incorrect first status value.

12. A computer-implemented method to generate status requests for units of work, the method comprising:

managing, by a server, environment state information maintaining a virtual collaboration environment, the environment state information including values of user parameters and values of work unit parameters, wherein the values of the user parameters are organized in user records corresponding to users interacting with and viewing the virtual collaboration environment, and the values of the work unit parameters are organized in work unit records corresponding to units of work managed, created, and/or assigned within the virtual collaboration environment, wherein individual units of work are individual action items individual ones of the users are to accomplish, wherein the users interact with and view the virtual collaboration environment via remotely located client computing platforms communicating with the server over an Internet connection, wherein the managing the environment state information includes updating the values of the work unit parameters responsive to user interactions with the units of work, including updating the values of the work unit parameters for a first unit of work responsive to one or more of the users interacting with the first unit of work;

establishing the Internet connection between the remotely located client computing platforms and the server;

identifying, by the server, one or more of the work unit records having potentially incorrect status values for a status parameter for the individual units of work, status values characterizing status of the individual units of work, wherein the one or more of the work unit records having the potentially incorrect status values are identified based on the values of the work unit parameters, including identifying a first work unit record as having a potentially incorrect first status value based on first values for the work unit parameters associated with the first unit of work;

generating, by the server, status requests prompting user input to update the potentially incorrect status values for the one or more of the work unit records identified, the status requests including a first status request prompting user input from a first user associated with the first unit of work to update the potentially incorrect first status value;

effectuating communication of information from the server to the remotely located client computing platforms over the Internet connection so that the remotely located client computing platforms present a user interface of the virtual collaboration environment including the status requests, the status requests in the user interface including user-selectable input elements through which the users provide the user input to update the potentially incorrect status values, including presenting the first status request via a first remotely located client computing platform associated with the first user, the first status request including a first user-selectable input element and a second user-selectable input element through which the first user provides the user input to update the potentially incorrect first status value;

obtaining, at the server, user input information conveying the user input into the user interface at the remotely located client computing platforms by the users; and updating, at the server, the potentially incorrect status values based on the user input information conveying the user input, including responsive to the user input of the first user including selection of the first user-selectable input element, updating the potentially incorrect first status value to a first updated value, and responsive to the user input of the first user including selection of the second user-selectable input element, updating the potentially incorrect first status value to a second updated value.

13. The method of claim 12, wherein interacting with the first unit of work includes one or more of working on the first unit of work, and/or uploading a file associated with the first unit of work.

14. The method of claim 12, wherein the first work unit record is identified based on the values for the work unit parameters associated with other units of work.

15. The method of claim 12, wherein the generating the status requests includes automatically generating the status requests responsive to updating the values of the work unit parameters.

16. The method of claim 12, wherein the first status request is generated responsive to receiving an update request from a second client computing platform associated with a second user.

17. The method of claim 12, further comprising:
determining a first suggested status update for the first status request based on the first values for the work unit parameters associated with the first unit of work, wherein the first user-selectable input element conveys the first suggested status update.

18. The method of claim 17, wherein the user input of the first user including the selection of the first user-selectable input element conveys approval of the first suggested status update and/or an indication of a status update for the first unit of work.

19. The method of claim 12, further comprising generating an incentive offer indicating an incentive for the first user based on the first values for the work unit parameters associated with the first unit of work.

20. The method of claim 19, further comprising:
effectuating presentation of the incentive offer to the first user via the first remotely located client computing platform; and
providing the incentive to the first user responsive to receiving the user input responsive to the first status request from the first user.

21. The method of claim 12, wherein the values of the work unit parameters indicating that the one or more of the work unit records have the potentially incorrect status values include the values of a file upload parameter and/or a last interaction parameter.

22. The method of claim 21, wherein the values of the work unit parameters indicating that the first work unit record has the potentially incorrect first status value include a value for the last interaction parameter corresponding to the first unit of work and/or a second unit of work, such that responsive to the value for the last interaction parameter corresponding to the first unit of work indicating the first user last interacted with the first unit of work before the value for the last interaction parameter corresponding to the second unit of work indicates the first user last interacted with the second unit of work, the first work unit record is identified as having the potentially incorrect first status value.

* * * * *